United States Patent [19]

Ruiz

[11] Patent Number: 5,002,783
[45] Date of Patent: * Mar. 26, 1991

[54] EDIBLE FOOD PRODUCT

[76] Inventor: Mark R. Ruiz, P.O. Box 28139, Santa Ana, Calif. 92799

[*] Notice: The portion of the term of this patent subsequent to Oct. 10, 2006 has been disclaimed.

[21] Appl. No.: 408,203

[22] Filed: Sep. 18, 1989

[51] Int. Cl.$^5$ .............................................. A21D 13/00
[52] U.S. Cl. ...................................... 426/138; 426/139; 426/144
[58] Field of Search ........................ 426/138, 139, 144

[56] References Cited

U.S. PATENT DOCUMENTS

| | | | |
|---|---|---|---|
| 2,508,724 | 5/1950 | Moffett | 426/138 |
| 3,800,054 | 3/1974 | Giesfeldt | 426/138 |
| 4,530,275 | 7/1985 | Stickle et al. | 426/138 |
| 4,765,998 | 8/1988 | Pak et al. | 426/138 |
| 4,873,099 | 10/1989 | Ruiz | 426/138 |

Primary Examiner—Donald E. Czaj
Assistant Examiner—Mary S. Mims
Attorney, Agent, or Firm—Roger A. Marrs

[57] ABSTRACT

An edible food product is disclosed herein having a shell or bowl composed of a consumable and digestible material consisting of a circular base reinforced by an annular bead joining in a continuous circular sidewall having a plurality of evenly spaced semicircular convolutions wherein each convolution is of the same diameter. The shell or bowl composition presents a textured exterior surface visually indicative of an edible product. The textured surface is characterized as being granular having a wall thickness and cross-section which is brittle and capable of being broken apart for ready consumption.

6 Claims, 2 Drawing Sheets

EDIBLE FOOD PRODUCT

BACKGROUND OF THE INVENTION

1. Field of the Invention

The present invention relates to food products and more particularly to a novel edible food product employable as a serving bowl and suitable for break-apart usage as a consumable food product.

2. Brief Description of the Prior Art

In the past, it has been the conventional practice to serve food in a rigid, non-breakable bowl so that it is convenient for the consumer to hold the food during the consumption of a meal and to remove the food from the bowl in small portions Such bowls or shells are usually made from a semi-solid product such as grain, flour or corn materials and are generally formed with a plurality of convolutions in a circular sidewall which is held together by a common base or bottom. The plurality of convolutions are not of equal diameter and the convolutions are not evenly spaced apart so that the integral strength of the sidewall is only as strong as the weakest convolution or separation between convolutions. Also, the structural integrity of the circular sidewall is adversely affected by providing the surfaces of the sidewall with irregularities so that load distribution is uneven. The same disadvantage is experienced by the common base or bottom which suffers from structural weakness due to surface irregularities and uneven attachment with the irregular convolutions of the sidewall.

Because of the fragile and non-reinforced sidewall construction, it is difficult to serve such a bowl or shell with food to an awaiting customer, and more particularly, it is difficult to stack or nest a plurality of shells together for shipment or transportation from place to place. Inasmuch as the convolutions of standard bowls or shells are uneven, a plurality of such bowls or shells cannot be placed in alignment for space-saving purposes which would normally permit easy packaging. Also, inasmuch as the sidewall is weakened, breakage frequently occurs so that packaging and shipping in quantity present a difficult problem. Some prior packaging techniques include the placement of cushion or spacers between adjacent ones of the bowls or shells so that they do not touch or transfer loads directly Other attempts may include the provision of elaborate holders, spaces and specially configured trays which are extremely expensive and require assembly procedures. Such procedures do not lend themselves to automatic counting, packaging or handling of a plurality of shells.

It is known to fabricate a food mold from metal or plastic; however, the convolutions and ribs provided in the mold are for effecting the transfer of shape from the mold to the end food product and not for purposes of providing strength or load-carrying purposes These latter features are gained by the rigid and non-brittle thickness of the mold wall structure. All application of loads and stress are absorbed by the wall material such as metal or plastic and the wall thickness with shape providing only ancillary support. Since the prior metal or plastic molds are not composed of edible material, thin and brittle construction cannot be tolerated when such molds are used solely for shaping or molding a curing food product.

Therefore, a long standing need has existed to provide a novel edible bowl or shell which is a break-away food product in itself for holding additional food items, such as salad, and wherein a plurality of such shells may be readily package together in a stack for shipment and transportation purposes without breakage.

SUMMARY OF THE INVENTION

Accordingly, the above problems and difficulties are obviated by the present invention which provides a novel edible food product composed of edible materials which is provided with a circular continuous sidewall formed with a plurality of reinforcing evenly spaced-apart convolutions of substantially identical diameter for maximum strength The external and internal surfaces of the continuous sidewall are provided with a surface texture characterized as being granular and brittle. The common bottom or base connecting and supporting the sidewall is provided with a circular or annular bead which interconnects the base with the lower part of the continuous sidewall, permitting the sidewall to taper outwardly from the base.

The sidewall of the bowl or shell permits nesting with a multiplicity of other identical shells or bowls so that stacking in space-saving relationship occurs. The stack of bowls or shells engage one another by means of the respective sidewall convolutions and the entire stack is carried in a form which is wrapped with a film to unitize the stack of bowls or shells, as disclosed in copending application having Ser. No. 07-131,919.

Therefore, it is among the primary objects of the present invention to provide a novel food product taking the form of an edible bowl or shell which includes improved load-carrying capabilities for its semi-rigid and brittle sidewall and common base so that the fragile sidewall will not buckle, tear or break apart under normal shipping or usage conditions.

Another object of the present invention is to provide a novel edible bowl or shell that lends itself for stacking in a nested manner with a plurality of other bowls or shells so that space is conserved in the resultant package and wherein the sidewall of each bowl or shell is reinforced to increase the structural integrity of the shell or bowl.

Still another object of the present invention is to provide a novel edible food product bowl which includes a plurality of molded ridges intended to reinforce the sidewall of the bowl as well as the common bottom thereof.

Another object of the present invention is to provide a novel food product bowl which includes even and regular appearing convolutions which not only reinforce the strength of the bowl but which permit ready stacking of bowls into a package for shipping and transportation purposes.

Still a further object of the present invention is to provide a novel edible food product bowl which is adapted for automation purposes during production and handling.

BRIEF DESCRIPTION OF THE DRAWINGS

The features of the present invention which are believed to be novel are set forth with particularity in the appended claims. The present invention, both as to its organization and manner of operation, together with further objects and advantages thereof, may best be understood with reference to the following description, taken in connection with the accompanying drawings in which:

FIG. 4a is a view similar to the view of FIG. 2a;

DESCRIPTION OF THE PREFERRED EMBODIMENT

Figure 1:
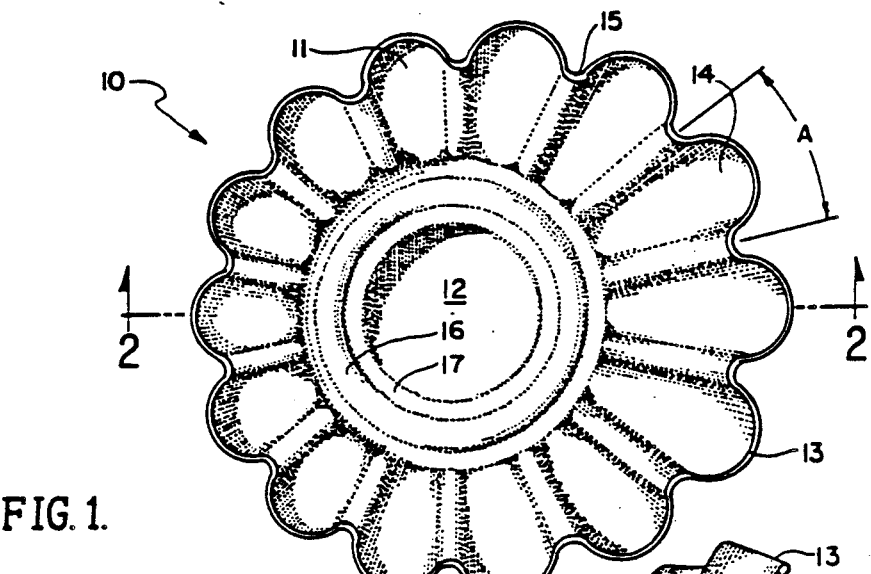
FIG. 1 is a top plan view of a novel food product shell incorporating the present invention.
Figure 2:
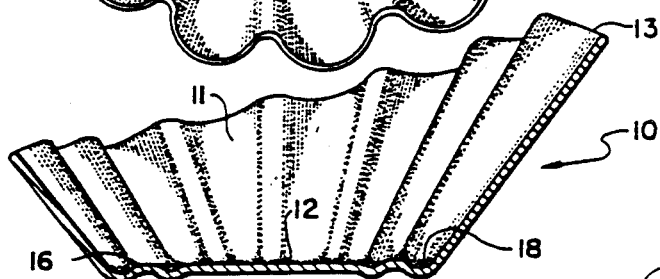
FIG. 2 is a transverse cross-sectional view of the food product shell shown in FIG. 1 taken in the direction of arrows 2—2 thereof.
Figure 2A:
FIG. 2a is an enlarged fragmentary cross-sectional showing granular surface texture corresponding to texture of digestible food composition.

The edible food product of the present invention is indicated in the general direction of arrow 10 in FIGS. 1 and 2. The food product illustrated is in the form of a bowl or shell into which food, such as salad, may be placed. The bowl is composed of an edible or consumable material which is prepared from suitable digestible foods and ingredients, such as grain, flour or corn, which are subject to forming and baking or heating so that the food ingredients bind together into the particular shape shown in the FIGURES. Therefore, it is to be understood that the shell or bowl is to be eaten by a consumer and that the shell or bowl includes a specific and critical shape and configuration necessitated by the employment of edible and digestive materials which are not noted for structural integrity.

With respect to the shape and configuration, the food product is rigid to the point of being brittle for easy break-away and reinforced so that the product is stable and not only constitutes an edible product but a shell product which may be readily combined with other shells into a package for transportation or shipment under load. The specific configuration presents a reinforced product which will not crumble or break when packaged for shipment, and yet the composition of the product is fragile because it is made of edible food product ingredients. Obviously, this edible product cannot be made from metal, plastic or the like.

The improvements are illustrated in FIGS. 1 and 2 wherein a continuous thin and brittle sidewall 11 is arranged in a circular fashion about a supporting thin and brittle bottom 12 wherein the continuous sidewall outwardly tapers or diverges from the bottom 12 to terminate in a continuous edge 13. It is also to be noticed that the sidewall 11 is provided with a plurality of convolutions, such as convolution 14, having a specific width indicated by A in FIG. 1. The plurality of convolutions substantially radiate upwardly and outwardly from the bottom 12 in fixed spaced-apart relationship. The convolutions are of a semicircular configuration and the diameter of each circular convolution is substantially identical so that uniformity of convolutions extends about the total sidewall. It is the regular and even construction of the convolutions that greatly assists in reinforcing the sidewall 11. Therefore, the respective convolutions 14 are substantially identical and the interconnecting area indicated by numeral 15 between convolutions is also substantially identical about the sidewall 11.

The edible bottom 12 is reinforced by annular beads represented by numerals 16 and 17 which are coaxially disposed with respect to the circular integral joint 18 with the bottom of the sidewall 11. Therefore, reinforcement is achieved in the sidewall by the plurality of identically formed convolutions 11 with their identically formed connection portions 15 and the reinforcement of the bottom 12 is achieved by the annular beads, such as 16 and 17. It is to be understood that the external and internal surfaces of the shell are provided with a surface texture indicative of a food product so that the thickness of the product is substantially constant but grainy throughout. The food product bowl or shell is integrally formed without any reduced thickness caused by surface irregularities or uneven convolutions or joining areas. The surface texture 19 is provided by the actual presence of edible food ingredients employed in the composition of the sidewall and bottom.

In the embodiment shown in FIGS. 1 and 2, the height of the sidewall 11 is varied so that the edge 13 is provided with a scalloped edge and the height is different along its circular configuration.

Figure 3:
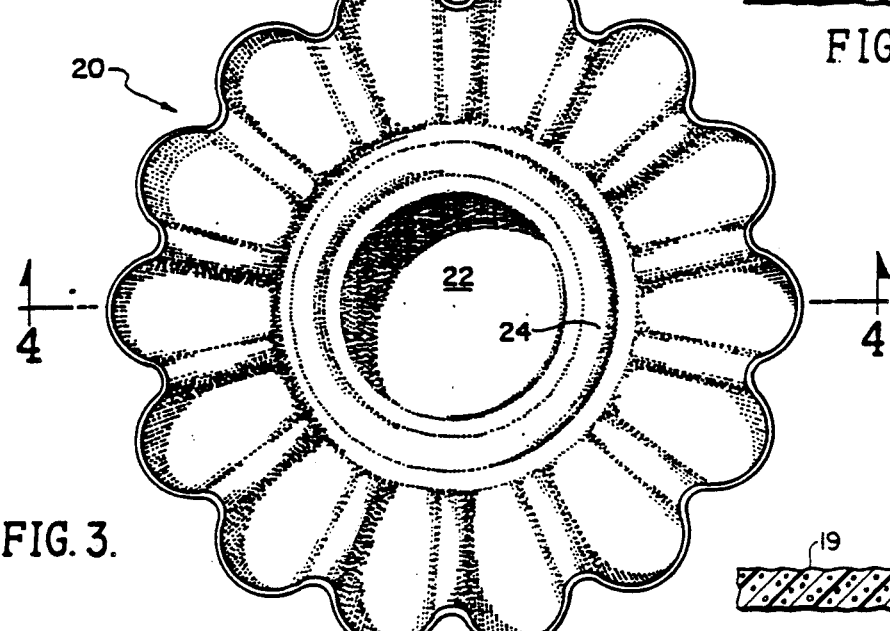
FIG. 3 is a top plan view illustrating another version of the present invention.
Figure 4A:
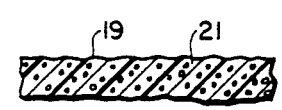
Figure 4:
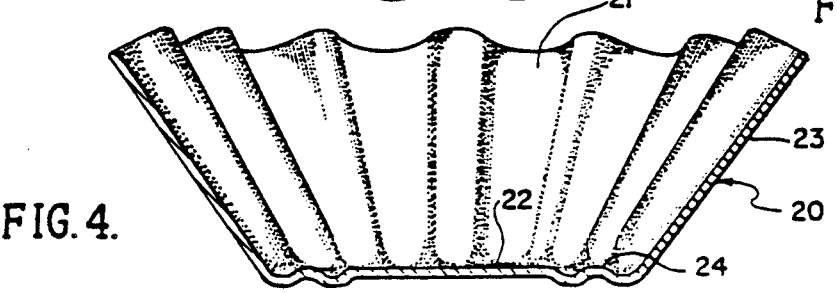
FIG. 4 is a transverse cross-sectional view of the food product shell as taken in the direction of arrows 4—4 of FIG. 3.

Referring now in detail to FIGS. 3 and 4, another version of food product bowl or shell is illustrated in the direction of arrow 20 which is substantially similar to the embodiment shown in FIGS. 1 and 2 with the exception that a sidewall 21 is of substantially the same height from the bottom 22. The shell or bowl 20 includes a sidewall 23 which is substantially coaxially disposed with respect to the bottom 22 and the plurality of convolutions are evenly spaced wherein each convolution is of the same diameter. The bottom or base 22 includes coaxially disposed integrally formed beads such as bead 24 that reinforces the base and a smooth textured surface is provided both externally and internally to aid in reinforcing the sidewall and base.

The bowl or shell, whether it be the version shown in FIGS. 1 and 2 or the version shown in 3 and 4, is nestable so as to provide a stack that may be confined together under load in a form for transportation and shipping purposes. The individual bowls or shells are nestable because of the constant diameter between convolutions as well as the convolutions themselves and because of the provision of coaxially disposed beads on the bases or bottoms. The structural integrity of the bowls or shells is enhanced by the evenly located convolutions and interconnecting portions, as well as the textured surface and the beaded base so that a plurality of the bowls or shells may be placed against one another in a stack so as to provide an even load distribution which resists cracking or damage to the rigid and brittle sidewall or bottom of the fragile bowl or shell.

Figure 5:
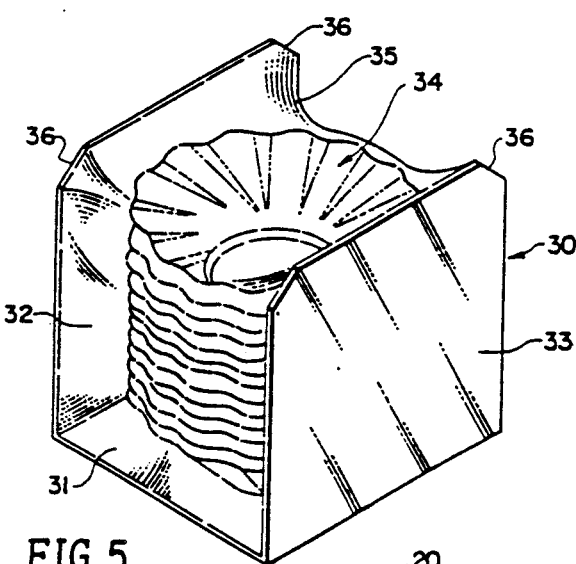
FIG. 5 is a front perspective view illustrating a plurality of food product shells nested into a package using the food product shell illustrated in FIGS. 1 and 2.

Referring now in detail to FIG. 5, the plurality of shells or bowls as shown in FIGS. 3 and 4, are arranged in such a stack and the stack is placed in a "U-shaped" form for carrier indicated by numeral 30. The carrier 30 comprises a base 31 having upright sides 32 and 33 wherein the opposing surfaces of the base and sides define a cavity into which the stack of bowls or shells represented by numeral 34 is placed. The stack and carrier are then wrapped in a clear plastic material, indicated by numeral 35, which is heated or otherwise shrunk so as to hold the stack 34 in intimate contact with the carrier 30. The exposed corners of the sides 32 and 33 are chamfered, such as indicated by numeral 36, so that the wrapping 35 may more closely extend into the storage cavity between the opposing surfaces of sides 32 and 33. The wrapping 35 may be of any suitable shrunk wrap film or material which will hold the package in an integral and unitary construction.

Figure 6:
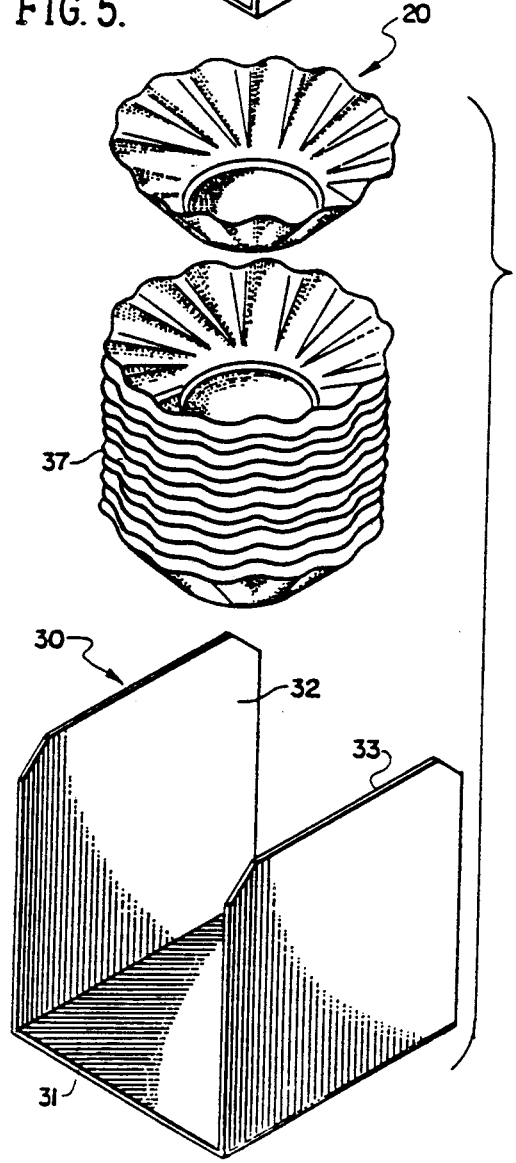
FIG. 6 is an exploded perspective view showing assembly of a plurality of food product shells resulting in the package of FIG. 5.

Referring now to FIG. 6, an exploded view illustrates the assembly of plurality of food product bowls or shells 20. Each bowl or shell of the plurality is placed on top of each other in order to provide a stack which is indicated by the numeral 37. Such an arrangement is possible since adjacent shells or bowls may be nested together due to the fact that each shell incorporates the identical shape and configuration of adjacent bowls or shells. Next, the stack of bowls or shells is introduced into the cavity between the opposing surfaces of sides 32 and 33 of the carrier 30. Once assembled, the assemblage is then wrapped with a transparent film 35 to provide a unitary package.

Figure 7:
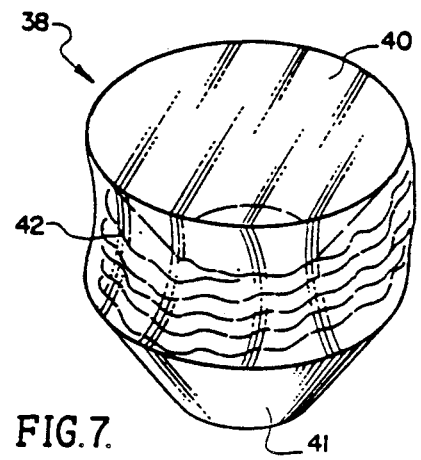
FIG. 7 is a front perspective view illustrating the food product shell package incorporating a plurality of shells of the version shown in FIGS. 1 and 2.
Figure 8:
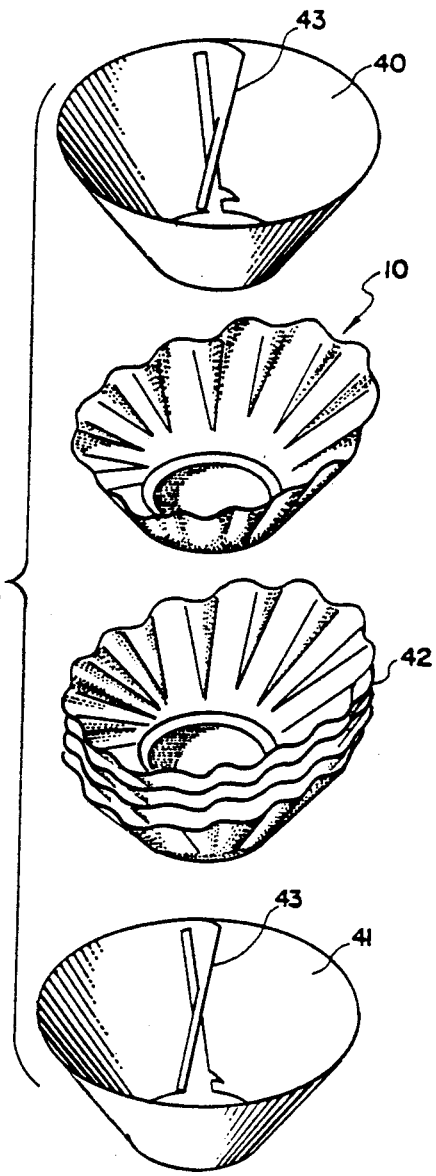
FIG. 8 is an exploded perspective view showing the assembly of food product shells resulting in the package of FIG. 7.

Referring to FIGS. 7 and 8, a package of bowls or shells having the configuration of the bowl or shell shown in FIGS. 1 and 2 is illustrated. The package is indicated in the general direction of arrow 38 which represents a fully assembled and unitized construction. In this package, a pair of conical members 40 and 41 is placed at the top and bottom of the stack, as indicated by numeral 42. Conical form 40 is introduced into the interior of the bowl while conical form or member 41 is placed around the external surface of the bottom bowl or shell of the stack. Once so arranged, a transparent film is placed around the forms and stack, and using heat shrink techniques, the film is reduced to hold the package due to a unitary construction.

Referring to FIG. 8, it can be seen that the conical forms 40 and 41 include an adjustment means indicated in both instances by numeral 43 whereby the diameter of the conical members may be adjusted to form fit with the interior of the bowls or shells. After the plurality of the bowls or shells have been stacked into the arrangement indicated by numeral 42, the upper form 40 is adjusted by means 43 to form fit with the interior of the topmost bowl or shell while the lower conical form 41 is adjusted to fit the exterior configuration of the lowermost bowl or shell in the stack. Once so assembled, the film may be wrapped about the package and reduced to provide the unitary configuration.

Therefore, it can be seen that the individual and fragile wall construction of the bowls or shells of the invention are reinforced by means of the regular convoluted configuration in cooperation with the textured exterior and interior surfaces in conjunction with the reinforced ribbing of the bases or bottom. Such reinforcement is not usual or needed in the normal production of a food product. Reinforcement of the sidewall and the base or bottom is critical so that a plurality of multiplicity of the bowls or shells may handle applied loads. Therefore, no spacers or cushion material are needed as separators between adjacent ones of the bowls or shells arranged in a stack. The surrounding film which wraps a package, including the carriers, is not substantially touched or engaged by the wrapping film so that the carrier itself carries the load of the film in its reduced or shrunken state. By this means, the food product bowl or shell is completely protected and reinforced so as to withstand the rigors of shipment, as well as the rigors of handling individually. Also, it is to be understood that the composition of each bowl or shell is definitely to be considered a food product since it is intended and expected to be consumed by a person so that its composition is completely digestible.

The inventive concept is not intended to cover metal, plastic or other non-digestible materials which rely upon their structural wall thickness and non-brittle characteristics to achieve structural strength wherein the shape or configuration of the material into a shaped mold is for purposes of design having nothing to do with structural loading or its ability to withstand rough handling and usage.

While particular embodiments of the present invention have been shown and described, it will be obvious to those skilled in the art that changes and modifications may be made without departing from this invention in its broader aspects and, therefore, the aim in the appended claims is to cover all such changes and modifications as fall within the true spirit and scope of this invention.

What is claimed is:

1. A consumable food product comprising:
   an edible shell consisting of a circular base integrally supporting an outwardly projecting break-away continuous sidewall;
   said shell characterized as composed of a brittle and digestible material with said sidewall of thin cross-sectional construction constituting a high strength-to-weight ratio;
   said shell further having external granular surface texture characteristic of said digestible material;
   said base provided with at least one annular reinforcement bead coaxially disposed with respect to said circular sidewall;
   said circular sidewall having a plurality of semicircular convolutions of equal diameter integrally provided about said circular base, each of said semicircular convolutions having a central axis radiating outwardly from said circular base; and
   said semicircular convolutions and said base annular bead cooperating to provide reinforcement and applied load-carrying characteristics.

2. The invention as defined in claim 1 wherein:
   said convolutions of equal diameter are provided in a series in adjacent side-by-side relationship; and
   said continuous sidewall angles outwardly to diverge from said circular base.

3. The invention as defined in claim 2 wherein:
   each circular sidewall terminates in a circular edge marginal region substantially parallel to said base and equidistant therefrom.

4. The invention as defined in claim 2 wherein:
   said diverging circular sidewall permits a plurality of said shells to be nested together in a stack whereby equal load paths are established conducting applied loads from shell to shell throughout said stack.

5. The invention as defined in claim 2 wherein:
   said circular sidewall terminates in a circular edge marginal region of varying height from said base.

6. The invention as defined in claim 2 wherein:
   said digestible material is selected from a grain, flour or corn.

* * * * *